2,573,463

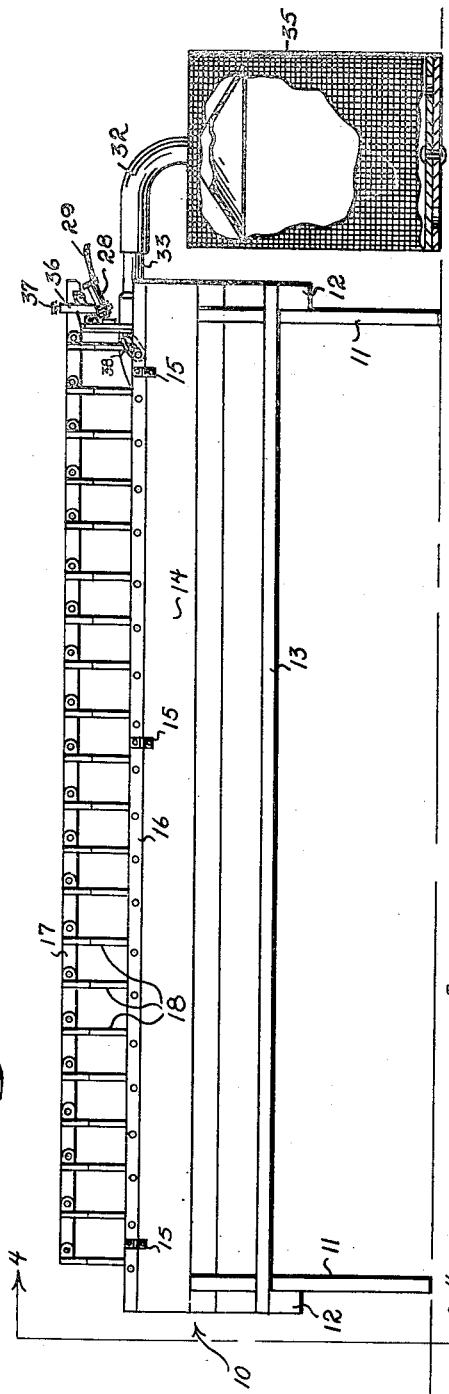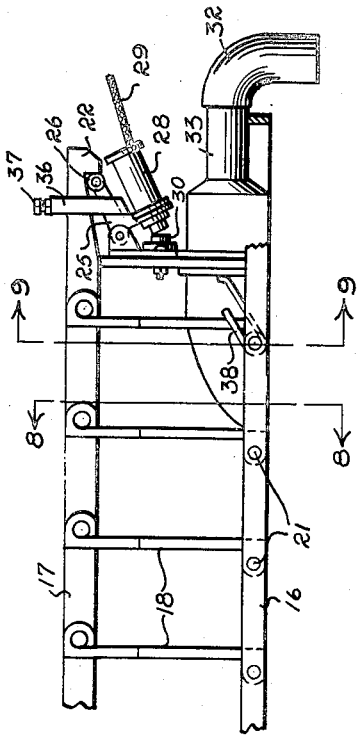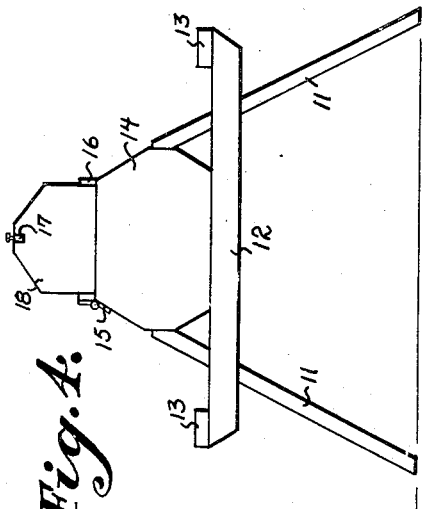

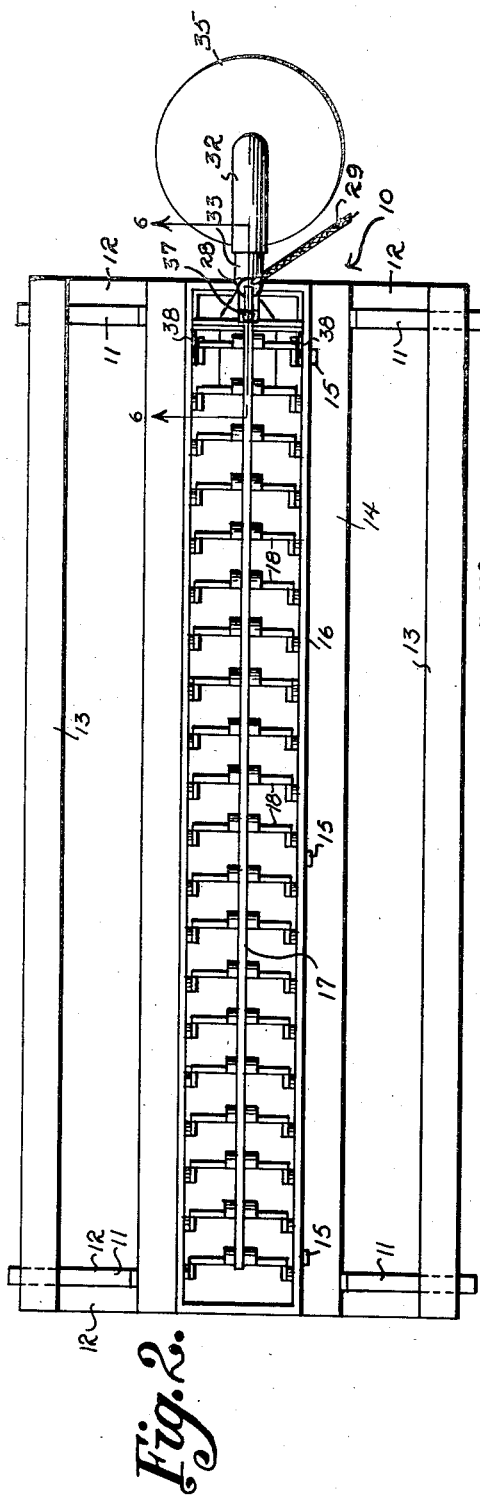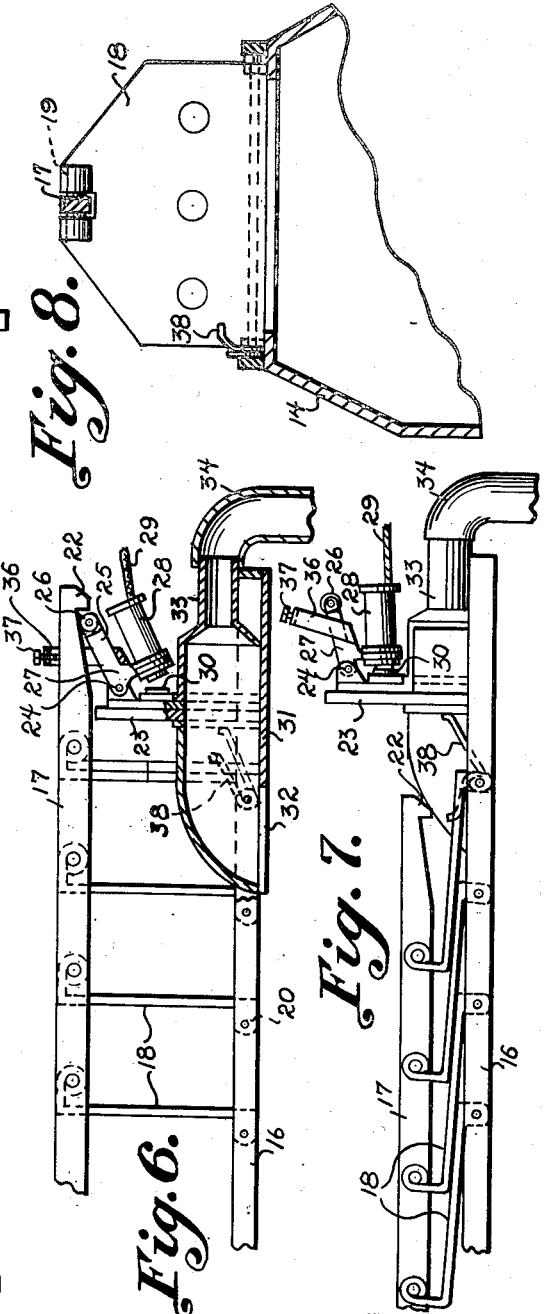
INVENTOR.
Reuben Linington
BY Victor J. Evans & Co.
ATTORNEYS Oct. 30, 1951  R. LININGTON  2,573,463
DUAL HOPPER TRAP
Filed April 14, 1947  3 Sheets-Sheet 3
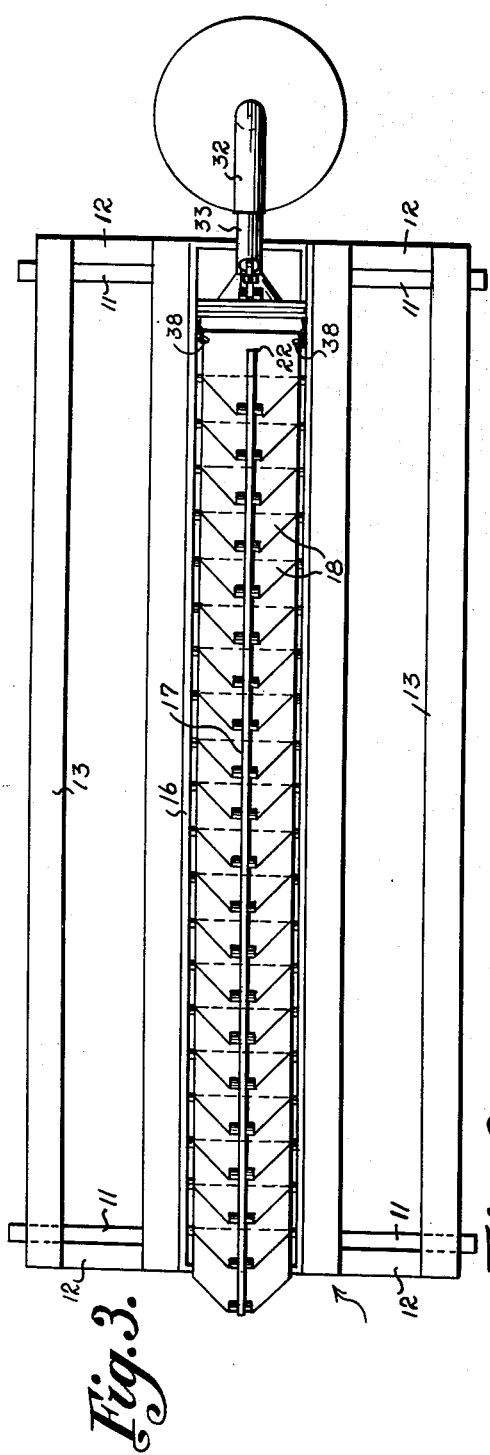
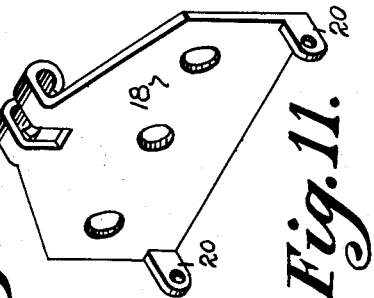
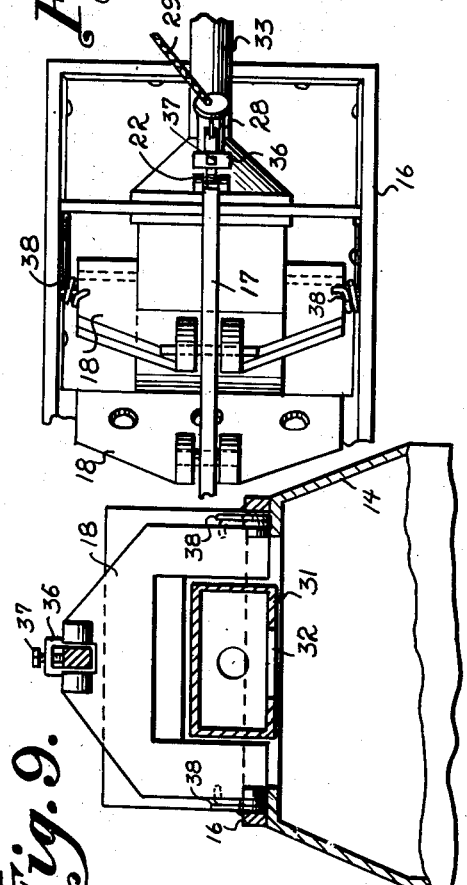
INVENTOR.
*Reuben Linington*
BY *Victor J. Evans & Co.*
ATTORNEYS Patented Oct. 30, 1951

UNITED STATES PATENT OFFICE 2,573,463

DUAL HOPPER TRAP

Reuben Linington, Belle Mead, N. J.

Application April 14, 1947, Serial No. 741,382

2 Claims. (Cl. 220—29)

1

The present invention relates to hopper traps and it consists in the combinations, constructions and arrangements of parts herein described and claimed.

Generally, the invention comprises an attachment for hoppers of the type designed for the feeding of fowl and the like and it comprises a cover frame having a plurality of hinged members thereon which are normally adapted to remain in a vertical position and be held in such position by means of a latch which is capable of remote control and upon the actuation of which springs are provided for the closing of the cover, much in the manner of Venetian blinds. At one end of the hopper there is provided an escape hatch which communicates with a wire type basket trap.

It is an object of the invention to provide a trap for hoppers and the like which is simple in construction and operation and which will be inexpensive to manufacture.

A further object of the invention is to provide a novel cover construction for hoppers and the like.

A further object of the invention is the provision of novel remotely controlled means for closing a cover for hoppers and the like.

A further object of the invention is the provision of a novel trap for capturing rodents which may enter said hoppers.

Other and further objects of the invention will become apparent from a reading of the following specification taken in conjunction with the drawings, in which:

Figure 1 is a side elevational view of an embodiment of the invention,

Figure 2 is a plan view of the device shown in Figure 1, in open position,

Figure 3 is a view similar to Figure 2 showing the device in closed position,

Figure 4 is an end elevational view of the device shown in Figure 1 looking in the direction of the arrows 4—4, Figure 5 is an enlarged fragmentary elevational view of a portion of the apparatus, Figure 6 is a sectional view taken along line 6—6 of Figure 2, Figure 7 is a view similar to Figure 5, but showing the device in another position, Figure 8 is a sectional view taken along line 8—8 of Figure 5, Figure 9 is a sectional view taken along line 9—9 of Figure 5, Figure 10 is a fragmentary plan view of one end of the apparatus, and

2

Figure 11 is a perspective view of an element of the invention.

Referring more particularly to the drawings, there is shown therein a hopper generally indicated at 10 and provided with legs 11, cross beams 12 and roost supports 13. Mounted upon the cross beams, centrally of the structure, is a hopper 14 hinged to which, as indicated at 15, is a cover frame 16 having a centrally located arm 17 to which is hinged a plurality of plates 18 as indicated at 19 in Figure 8. The lower ends of the plates are provided with ears 20 which are hingedly attached to the frame member 16 as indicated at 21.

The forward end of the arm 17 is provided with a latch member 22. Hingedly mounted to an upright 23 as indicated at 24 is a latch arm 25 provided with a roller contact 26 at its outer end which roller is adapted to engage the latch member 22. A projection 27 on the arm 25 is adapted to hold the solenoid 28 which is supplied by means of a wire 29 with current, the flow of which is controlled by a remotely placed switch (not shown). The upright 23 is affixed to the frame 16 in any suitable manner and carries a solenoid contact plate 30.

At the forward end of the hopper there is positioned an escape hatch 31 having a downwardly directed opening 32 which communicates with the hopper 14 and is provided with an outwardly extending pipe-like opening 33 to which is affixed an L-shaped pipe fitting 34 which communicates with a wire basket type rodent trap 35.

In the operation of the device it will be apparent that the plates 18 forming the cover are normally in the position indicated in Figure 1, that is to say in a vertical position, being held thereby by means of the latch member 22, which latch member 22, incidentally, may be locked in position by a safety arm 36 and nut 37 threaded therein. When it is desired to close the cover, it is only necessary to close the remote switch which will actuate the solenoid 28 which, in turn, will be attracted to the solenoid contact 30 thus releasing the roller 26 from the latch member 22 whereupon a powerful spring 38 carried by the frame and bearing against one of the plates 18 will cause the arm 17 to move to the left as viewed in Figure 1 thus closing all of the plates 18 as shown in Figure 3. Any rats or other rodents which may thus be entrapped within the hopper may escape only through the opening 32 and thus pass through the escape hatch 31, through pipes 33 and 34 and into the trap 35 after which said trap may be disengaged from the apparatus and immersed in water to drown the rodents.

While but one form of the invention has been shown and described herein, it will be readily apparent to those skilled in the art that many minor modifications may be made without departing from the spirit of the invention or the scope of the appended claims.

What is claimed is:

1. A cover for a hopper having an escape hatch comprising a cover frame hingedly connected to said hopper, a plurality of plates each of which are hingedly connected to said frame, an arm extending longitudinally of the frame and hingedly connected to each plate centrally thereof, said arm adapted for longitudinal movement of the frame to move said plates into closed position with relation to the hopper, a latch formation on one end of said arm, an upright mounted on the escape hatch of the hopper, a latch arm pivoted at one end to said upright, a roller rotatably mounted on the opposite end of said latch arm adapted to have rolling engagement with said latch formation to prevent longitudinal movement of said first arm and retain the plates in open relation to said hopper, a projection on said latch arm adjacent the pivoted end thereof, a solenoid carried by said projection, switch controlled means connected to said solenoid for energizing said solenoid from a remote distance from said hopper, a solenoid contact plate carried by said upright which will when the solenoid is energized attract the solenoid to move the latch arm to disengage the roller from the latch formation to permit longitudinal movement of said first arm, and a spring means carried by the frame and engaging one of said plates and said upright, will cause the first arm to move longitudinally to close the plates over the hopper.

2. A cover as described in claim 1 wherein means is provided on said latch arm for engagement with said first arm for retaining said latch arm in latched relation to said latch formation.

REUBEN LININGTON.

REFERENCES CITED

The following references are of record in the file of this patent:

UNITED STATES PATENTS

| Number | Name | Date |
| --- | --- | --- |
| 90,402 | Smith | May 25, 1869 |
| 173,258 | Blauvelt | Feb. 8, 1876 |
| 1,807,944 | Thibault | June 2, 1931 |

FOREIGN PATENTS

| Number | Country | Date |
| --- | --- | --- |
| 86,731 | Australia | Dec. 27, 1921 |